United States Patent Office … 3,093,655 … Patented June 11, 1963

3,093,655
CARBOXYLIC ACID-POLYETHYLENE POLY-
AMINE REACTION MIXTURE
Elizabeth C. Dearborn, Boston, and Philip K. Isaacs,
Brookline, Mass., assignors to W. R. Grace & Co., Cambridge, Mass., a corporation of Connecticut
No Drawing. Filed Dec. 28, 1960, Ser. No. 78,873
3 Claims. (Cl. 260—309.6)

This invention relates to compositions containing a complex compound having a plurality of imidazoline rings as a principal constituent. In another aspect it relates to a method for preparing such compositions by contacting a plurality of diverse carboxylic acids and a polyethylene polyamine under reactive conditions.

Monoimidazolines, such as undecylimidazoline, and diimidazolines, such as octamethylene diimidazoline, are known but have limited utility. The complex polyimidazoline of this invention contains a terminal primary amino group (—NH$_2$), has a high molecular weight, is strongly basic, and possesses strong surface activity. When incorporated with a polymeric material, such as polymers and copolymers of vinyl chloride, it performs admirably as a curing agent.

The present compositions are prepared by heating oleic and sebacic acids and triethylene tetramine at reduced pressures under nitrogen while vigorously agitating the reactants. Imidazoline formation proceeds essentially in two steps. In the first step, a terminal amino group of the polyamine reacts with a carboxyl group to form an amide with the release of one mole of water. Then, a second mole of water splits out from the amide group and a secondary amino group beta to it, causing cyclization to give an imidazoline. Dicarboxylic acids reacting with polyamines in this manner produce a complex polyimidazoline containing imidazoline rings plus some amide groups and secondary amino groups resulting from incomplete cyclization. The overall reaction yields a mixture comprising a major amount of (1) a polyimidazoline having the following idealized structure:

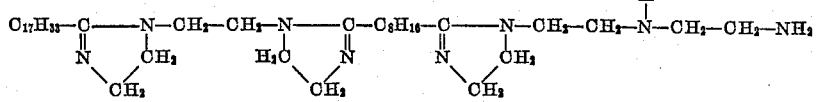

in which up to about 15 percent of the original carboxyl groups are in the form of unconverted amides

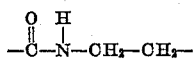

derived from the reaction of acid with primary amine groups, and/or N-substituted amides

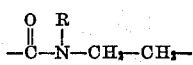

derived from either hydrolysis of previously formed imidazoline rings or the reaction of acid with secondary amine groups, and/or (2) species of imidazolines and polyimidazolines having higher and lower molecular weights than the molecular weight of the idealized polyimidazoline structure.

In carrying out the invention, the oleic acid is first charged to a glass-lined mixing vessel and then the sebacic acid is stirred in. Agitation is continued throughout the reaction period. The acid mixture is deoxygenated at a pressure of about 15 mm. Hg, the vacuum is released with nitrogen and a blanketing stream of nitrogen is thereafter used throughout the reaction. Following deoxygenation, the acids are heated to about 70° C., the requisite amount of triethylene tetramine is added and the temperature rises to about 100° C. due to salt formation.

Immediately after adding all of the triethylene tetramine, the system is protected during synthesis against catalytic pro-oxidant metals by the addition of a chelating and inactivating agent. These metals, which are introduced as impurities in the acid and amine reactants, catalyze degration of the reaction product with a resulting increase in viscosity and darkening of the product. Even small leaks in the packing surrounding the agitator shaft through which atmospheric oxygen can gain entrance into the mixing vessel can cause a tenfold increase in the viscosity. The agent is added in amounts sufficient to react with substantially all of the metallic impurities present in the reactants and generally between 0.1 percent to 0.5 percent by weight based on the total weight of the acids and amines has been found satisfactory. Suitable agents include the alkali metal polyphosphates, such as sodium and potassium tripolyphosphate.

The mixture is then heated at 1 atmosphere to about 150° C. at which point the pressure and temperature are adjusted periodically in inverse relationship according to the following schedule:

| Heating period in minutes after reaction mixture has reached 150° C. at 1 atm. | Temperature, ° C. | Pressure, mm. Hg |
|---|---|---|
| 20 | 152.5 | 585 |
| 40 | 152.5 | 435 |
| 60 | 155 | 335 |
| 80 | 165 | 235 |
| 100 | 182.5 | 135 |
| 120 | 192.5 | 110 |
| 140 | 202.5 | 85 |
| 160 | 212.5 | 35 |
| 180 | 220 | 15 |

Since water catalyzes side reactions and hydrolyzes imidazolines, it is removed as it is formed in order to achieve maximum conversion to imidazoline. The above schedule permits removal of water as fast as possible consistent with imidazoline conversion without distilling appreciable amounts of tetramine. During the reaction period, the agitator should be run at a high rate of speed to give a high surface turnover of the mixture for rapid water removal. An agitator speed of about 100–200 r.p.m. has been found to be satisfactory. Experiments have shown that low water removal caused by decreasing the speed from about 150 to 65 r.p.m. lowered the imidazoline content by about 10 percent due to irreversible hydrolysis of the imidazoline ring.

After a temperature of about 220° C. and a pressure of about 15 mm. Hg have been reached within three hours according to the foregoing schedule, this pressure and temperature are held and the reaction mixture is heated further for about one hour under these conditions. Thereafter the product is cooled to 150° C. under nitrogen and collected. The viscosity of the reaction product averages about 1,000 centipoises at 60° C. The average composition as determined by infrared absorption analysis is comprised of structures resulting from 85 percent conversion of the carboxyl groups to imidazoline rings with the remaining 15 percent of the carboxyl groups existing as amide groups.

The molar quantities of acids and amine used to prepare the reaction mixtures are 1 mole of oleic acid, 1 mole of sebacic acid and 2 moles of triethylene tetramine.

The invention is further illustrated by the following examples:

Example 1

82.6 lbs. (0.2925 mole) of oleic acid were charged to a glass a vacuum vessel and then 59.1 lbs. (0.2925 mole) of sebacic acid were added. The acids were heated to about 70° C. and then 85.5 lbs. (0.5850 mole) of triethylene tetramine were added. Due to the exothermic nature of the reaction between the amine and acids, the temperature of the mixture rose to about 100° C. 0.23 lb. of powdered sodium tripolyphosphate was then added as a metal chelating agent. Vigorous agitation and a nitrogen atmosphere were maintained throughout. The mixture was then heated at 1 atmosphere to about 150° C. and the temperature and pressure were carefully controlled thereafter for a four-hour period according to the pressure-temperature schedule set forth hereinbefore. During this period, water of condensation was continuously removed to avoid hydrolysis of the imidazolines. The amount of water removed over the entire reaction period corresponded with about 85 percent conversion of the carboxyl groups to imidazoline groups, leaving a balance of about 15 percent of the carboxyl groups in the form of amides. The composition of the reaction mixture was confirmed by infrared absorption analysis. Finally, the product was cooled under nitrogen to about 130° C.

The utility of the reaction product is demonstrated in the following Example 2:

Example 2

1 part by weight of a product prepared according to Example 1 was admixed with 4 parts by weight of epoxidized soybean oil having an oxirane oxygen content of 7.0 percent. The mixture was heated for about 1 hour at about 130° C. and gave a reaction product which was fluid at room temperature. 63 parts of the fluid reaction product were then compounded with 50 parts of Geon 202 (a copolymer consisting of about 95 percent vinyl chloride and 5 percent vinylidene chloride), 50 parts of Geon 121 (paste grade polyvinyl chloride) and 37 parts of clay filler. This formulation was then cured at 190° C. for periods of 1 and 3 minutes. The results of such cure were as follows:

|  | 1-minute cure | 3-minute cure |
|---|---|---|
| Approximate number of crosslinks per 10,000 molecular weight | 1.5 | 4.0 |
| Percent extraction by cyclohexanone | 10 | 8 |

It is noted that the acids-amine reaction mixture of this invention gave a highly-crosslinked polymer which was cured in a very short period of time. The very low cyclohexanone extraction value renders the polymer suitable for use as a solvent resistant gasketing material.

We claim:

1. A composition derived by reacting in a deoxygenated system 1 mole of oleic acid, 1 mole of sebacic acid and 2 moles of triethylene tetramine at a temperature of about 50° C. to 240° C. and a pressure of about 10 to 760 mm. Hg while continuously removing the water of reaction, and continuing the reaction until the flow of water of reaction substantially ceases.

2. A composition according to claim 1 wherein the reaction is carried out in the presence of a small amount of a chelating agent.

3. A composition according to claim 2 wherein the chelating agent is sodium tripolyphosphate.

References Cited in the file of this patent

UNITED STATES PATENTS

| 2,374,354 | Kaplan | Apr. 24, 1945 |
| 2,568,876 | White et al. | Sept. 25, 1951 |
| 2,668,165 | Carpenter | Feb. 2, 1954 |
| 2,846,440 | Hughes | Aug. 5, 1958 |
| 2,917,376 | Stromberg et al. | Dec. 15, 1959 |